United States Patent
Lv et al.

(10) Patent No.: US 10,872,554 B2
(45) Date of Patent: Dec. 22, 2020

(54) DISPLAY SCREEN, DEVICE AND LUMINANCE COMPENSATION METHOD FOR BEZEL BORDER

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Hongliang Lv, Beijing (CN); Libao Cui, Beijing (CN); Boning Wang, Beijing (CN); Ruifeng Yang, Beijing (CN); Litao Fan, Beijing (CN); Yufei Liu, Beijing (CN); Huaxu Yang, Beijing (CN); Qingnan Al, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/454,219

(22) Filed: Jun. 27, 2019

(65) Prior Publication Data
US 2020/0082750 A1 Mar. 12, 2020

(30) Foreign Application Priority Data
Sep. 12, 2018 (CN) .......................... 2018 1 1061059

(51) Int. Cl.
*G09G 3/20* (2006.01)
*G06F 1/16* (2006.01)

(52) U.S. Cl.
CPC .......... *G09G 3/2074* (2013.01); *G06F 1/1601* (2013.01); *G06F 1/1637* (2013.01); *G09G 2310/0232* (2013.01); *G09G 2320/0233* (2013.01); *G09G 2320/0686* (2013.01)

(58) Field of Classification Search
CPC ......... G09G 3/2074; G09G 2320/0686; G09G 2320/0233; G09G 2310/0232; G06F 1/1601; G06F 1/1637
See application file for complete search history.

(56) References Cited

U.S. PATENT DOCUMENTS

2016/0253965 A1* 9/2016 Rappoport ............... G09G 3/20
 345/694
2019/0073961 A1* 3/2019 Park ....................... G06F 1/1637

* cited by examiner

*Primary Examiner* — Liliana Cerullo
(74) *Attorney, Agent, or Firm* — Brooks Kushman P.C.

(57) ABSTRACT

The present disclosure provides a display screen, a display device and a luminance compensation method. The display screen includes a window area and a bezel area; wherein the window area includes a first sub-area for actual display and a second sub-area provided around the first sub-area, the bezel area is provided in a periphery of the window area; the display screen further includes an auxiliary pixel area provided with multiple auxiliary pixels, the auxiliary pixel area covers at least the second sub-area, and the auxiliary pixels are controlled to present a same color as the bezel area when the display screen is switched on.

15 Claims, 5 Drawing Sheets

DISPLAY SCREEN, DEVICE AND LUMINANCE COMPENSATION METHOD FOR BEZEL BORDER

CROSS-REFERENCE TO RELATED APPLICATION

This application claims priority to Chinese Patent Application No. 201811061059.6 filed on Sep. 12, 2018, which is incorporated herein by reference in its entirety.

TECHNICAL FIELD

The present disclosure relates to the field of display technology, and in particular to a display screen, a display device and a luminance compensation method.

BACKGROUND

With the development of display technology, the appearance of a display device (which is a human-computer interaction interface), especially a consumer display device, often affects the choice of consumers.

In order to prevent the display area of the display screen from being shielded, generally, the size of the window area of the display screen in a current display device may be increased. However, due to the increase in the size of the window area, the black matrix (BM) at the edge of the display area is usually exposed to the window area, thereby causing a black border on the display screen, which affects the display effect of the display screen.

SUMMARY

According to a first aspect of the present disclosure, provided is a display screen which includes a window area and a bezel area;

wherein the window area includes a first sub-area for actual display and a second sub-area provided around the first sub-area, the bezel area is provided in a periphery of the window area, the display screen further includes an auxiliary pixel area provided with multiple auxiliary pixels, the auxiliary pixel area covers at least the second sub-area, and the auxiliary pixels are controlled to present a same color as the bezel area when the display screen is switched on.

Optionally, the auxiliary pixels are controlled to present a same color as the first sub-area when the display screen is switched off.

Optionally, the auxiliary pixels are controlled to not perform display when the display screen is switched off.

Optionally, the auxiliary pixels are controlled to present a same color as the bezel area when the display screen is switched off.

Optionally, the auxiliary pixel area is overlapped with a part of the bezel area, and auxiliary pixels provided at the overlapping position are shielded by the bezel.

Optionally, a lateral dimension of the window area is determined on the basis of a lateral dimension of the first sub-area, a dimensional tolerance of the first sub-area, and a dimensional tolerance of the window area; and/or, a longitudinal dimension of the window area is determined on the basis of a longitudinal dimension of the first sub-area, the dimensional tolerance of the first sub-area, and the dimensional tolerance of the window area.

Optionally, the lateral dimension $VA_W$ of the window area is:

$$VA_W = P_W \times a + T_{AA} + T_{VA} + k \times a;$$

the longitudinal dimension $VA_H$ of the window area is:

$$VA_H = P_H \times a + T_{AA} + T_{VA} + k \times a;$$

wherein, $P_W$ is a number of lateral pixels of the first sub-area, $P_H$ is a number of longitudinal pixels of the first sub-area, $T_{AA}$ is the dimensional tolerance of the first sub-area, $T_{VA}$ is the dimensional tolerance of the window area, a is a dimension of a single pixel in the first sub-area, and k is a preset coefficient.

Optionally, a number of lateral pixels of the auxiliary pixel area is determined on the basis of a lateral dimension of the window area, an assembly tolerance of the window area and the display screen, and a number of lateral pixels of the first sub-area; and/or, a number of longitudinal pixels of the auxiliary pixel area is determined on the basis of a longitudinal dimension of the window area, the assembly tolerance of the window area and the display screen, and a number of longitudinal pixels of the first sub-area.

Optionally, the number $SP_W$ of the lateral pixels of the auxiliary pixel area is:

$$SP_W = \lceil (VA_W + T_{AS}) \div a \rceil - P_W;$$

the number $SP_H$ of the longitudinal pixels of the auxiliary pixel area is:

$$SP_H = \lceil (VA_H + T_{AS}) \div a \rceil - P_H;$$

wherein, $VA_W$ is the lateral dimension of the window area, $VA_H$ is the longitudinal dimension of the window area, $T_{AS}$ is the assembly tolerance of the window area and the display screen, $P_W$ is the number of lateral pixels of the first sub-area, $P_H$ is the number of longitudinal pixels of the first sub-area, a is a dimension of a single pixel in the first sub-area, and ⌈ ⌉ is a ceiling symbol.

Optionally, the auxiliary pixel area is divided into a first region and a second region laterally opposed to each other, and a third region and a fourth region longitudinally opposed to each other;

a number of lateral pixels of each of the first region and the second region is determined on the basis of a number of lateral pixels of the auxiliary pixel area, a number of lateral pixels of the first region shielded by the bezel area, and a number of lateral pixels of the second region shielded by the bezel area; and/or, a number of longitudinal pixels of each of the third region and the fourth region is determined on the basis of a number of longitudinal pixels of the auxiliary pixel area, a number of longitudinal pixels of the third region shielded by the bezel area, and a number of longitudinal pixels of the fourth region shielded by the bezel area.

Optionally, the number $SPL_W$ of the lateral pixels of the first region is:

$$SPL_W = \lceil (SP_W - N_L - N_R) \div 2 \rceil + N_L;$$

the number $SPR_W$ of the lateral pixels of the second region is:

$$SPR_W = SP_W - SPL_W;$$

the number $SPU_H$ of the longitudinal pixels of the third region is:

$$SPU_H = \lceil (SP_H - N_U - N_D) \div 2 \rceil + N_U;$$

the number $SPD_H$ of the longitudinal pixels of the fourth region is:

$$SPD_H = SP_H - SPU_H;$$

wherein $SP_W$ is the number of the lateral pixels of the auxiliary pixel area, $SP_H$ is the number of the longitudinal pixels of the auxiliary pixel area, $N_L$ is the number of the lateral pixels of the first region shielded by the bezel area, $N_R$ is the number of the lateral pixels of the second region shielded by the bezel area, $N_U$ is the number of the longitudinal pixels of the third region shielded by the bezel area, $N_D$ is the number of the longitudinal pixels of the fourth region shielded by the bezel area, and [ ] is a rounding symbol.

Optionally, when a n-th column of sub-pixels of the auxiliary pixel area is shielded by the bezel area, a luminance compensation is performed by a m-th column of sub-pixels adjacent to the n-th column of sub-pixels, the m-th column of sub-pixels has a same color as the n-th column of sub-pixels and is not shielded by the bezel area.

Optionally, a luminance compensation value $\Delta L$ of the m-th column of sub-pixels is:

$$\Delta L = x \div a \times L$$

wherein, x is a shielded width of the n-th column of sub-pixels, a is a width of the n-th column of sub-pixels, and L is a luminance of the m-th column of sub-pixels.

Optionally, when a (n+1)-th column of sub-pixels and a (n+2)-th column of sub-pixels which belong to a same pixel as the n-th column of sub-pixels are completely shielded by the bezel area, a luminance compensation value $\Delta L_1$ of the (m+1)-th column of sub-pixels is:

$$\Delta L_1 = (1 - x \div a) \times L_1;$$

a luminance compensation value $\Delta L_2$ of the (m+2)-th column of sub-pixels is:

$$\Delta L_2 = (1 - x \div a) \times L_2;$$

wherein the (m+1)-th column of sub-pixels is adjacent to the (n+1)-th column of sub-pixels, has a same color as the (n+1)-th column of sub-pixels, and is not shielded by the bezel area, the (m+2)-th column of sub-pixels is adjacent to the (n+2)-th column of sub-pixels, has a same color as the (n+2)-th column of sub-pixels, and is not shielded by the bezel area; x is a shielded width of the n-th column of sub-pixels, a is a width of the n-th column of sub-pixels, $L_1$ is a luminance of the (m+1)-th column of sub-pixels, and $L_2$ is a luminance of the (m+2)-th column of sub-pixels.

According to a second aspect of the present disclosure, further provided is a display device including the above display screen.

According to a third aspect of the present disclosure, further provided is a method for determining a size of a window area applied to the above display screen, and the method includes:

determining first relevant parameters of a first sub-area of the display screen;

determining a lateral dimension and a longitudinal dimension of the window area on the basis of the first relevant parameters of the first sub-area and a dimensional tolerance of the window area of the display screen;

wherein the first relevant parameters of the first sub-area include: a number of the lateral pixels of the first sub-area, a number of the longitudinal pixels of the first sub-area, a dimension of a single pixel in the first sub-area, and a dimensional tolerance of the first sub-area.

Optionally, the lateral dimension $VA_W$ of the window area is:

$$VA_W = P_W \times a + T_{AA} + T_{VA} + k \times a;$$

the longitudinal dimension $VA_H$ of the window area is:

$$VA_H = P_H \times a + T_{AA} + T_{VA} + k \times a;$$

wherein, $P_W$ is a number of lateral pixels of the first sub-area, $P_H$ is a number of longitudinal pixels of the first sub-area, $T_{AA}$ is the dimensional tolerance of the first sub-area, $T_{VA}$ is the dimensional tolerance of the window area, a is a dimension of a single pixel in the first sub-area, and k is a preset coefficient.

According to a fourth aspect of the present disclosure, further provided is a method for determining a number of pixels of the auxiliary pixel area applied to the above display screen, and the method includes:

determining second relevant parameters of the first sub-area of the display screen and relevant parameters of the window area of the display screen;

determining a number of lateral pixels and a number of longitudinal pixels of the auxiliary pixel area of the display screen, on the basis of the second relevant parameters of the first sub-area, the relevant parameters of the window area of the display screen, and an assembly tolerance of the window area and the display screen;

wherein the second relevant parameters of the first sub-area include: a number of lateral pixels of the first sub-area, a number of longitudinal pixels of the first sub-area, and a dimension of a single pixel in the first sub-area; the relevant parameters of the window area include: a lateral dimension of the window area, and a longitudinal dimension of the window area.

Optionally, the number $SP_W$ of the lateral pixels of the auxiliary pixel area is:

$$SP_W = \lceil (VA_W + T_{AS}) \div a \rceil - P_W;$$

the number $SP_H$ of the longitudinal pixels of the auxiliary pixel area is:

$$SP_H = \lceil (VA_H + T_{AS}) \div a \rceil - P_H;$$

wherein, $VA_W$ is the lateral dimension of the window area, $VA_H$ is the longitudinal dimension of the window area, $T_{AS}$ is the assembly tolerance of the window area and the display screen, $P_W$ is the number of lateral pixels of the first sub-area, $P_H$ is the number of longitudinal pixels of the first sub-area, a is a dimension of a single pixel in the first sub-area, and ⌈ ⌉ is a ceiling symbol.

According to a fifth aspect of the present disclosure, further provided is a luminance compensation method applied to the above display screen, and the method includes:

detecting whether pixels in the auxiliary pixel area of the display screen are shielded by the bezel area of the display screen;

performing, when a n-th column of sub-pixels of the auxiliary pixel area is shielded by the bezel area, a luminance compensation by a m-th column of sub-pixels adjacent to the n-th column of sub-pixels, the m-th column of sub-pixels having a same color as the n-th column of sub-pixels and is not shielded by the bezel area.

BRIEF DESCRIPTION OF THE DRAWINGS

In order to illustrate the technical solutions of the embodiments of the present disclosure more clearly, the drawings to be used in the embodiments of the present disclosure will be briefly described below. It is obvious that the drawings in the following description are only some embodiments of the present disclosure, and those skilled in the art can also obtain other drawings based on these drawings without any creative labor.

DETAILED DESCRIPTION

The technical solutions in the embodiments of the present disclosure may be described hereinafter in details in conjunction with the drawings in the embodiments of the present disclosure. It is obvious that the described embodiments are a part of the embodiments of the present disclosure, and not all of them. All other embodiments obtained by those skilled in the art based on the embodiments of the present disclosure without any creative labor fall within the protective scope of the present disclosure.

Figure 1:
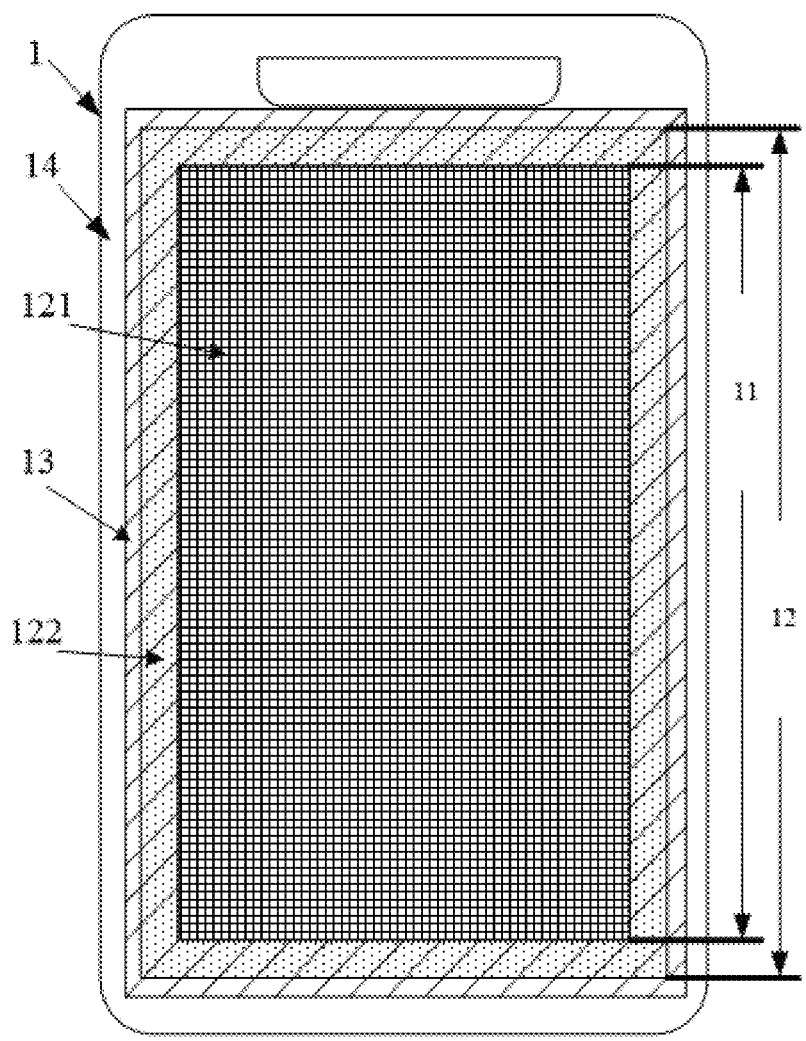
FIG. 1 is a schematic diagram of a display screen of an embodiment of the present disclosure.

As shown in FIG. 1, an embodiment of the present disclosure provides a display screen 1 which may include a window area 12 and a bezel area 14;

wherein the window area 12 includes a first sub-area 121 for actual display and a second sub-area 122 provided around the first sub-area, the bezel area 14 is provided in a periphery of the window area, the display screen 1 further includes an auxiliary pixel area 13 provided with multiple auxiliary pixels, the auxiliary pixel area 13 covers at least the second sub-area 122, and the auxiliary pixels are controlled to present a same color as the bezel area 14 when the display screen 1 is switched on.

The above window area is an area located inside the bezel area on the display screen, wherein the first sub-area 121 is the display area 11 for actual display, as shown in FIG. 1. Herein, the terms "first sub-area" and "display area" indicate one and the same display screen area, and can be used instead of each other.

The second sub-area 122, which is located at the edge of the window area 12 and is arranged surround the display area 11, is an area not used for actual display, and corresponds to the region for the black matrix. In the related art, the pixels in this region are not used for actual display, thus the black matrix may be exposed and a black border is formed.

The auxiliary pixel area 13 (corresponding to the region with oblique lines in FIG. 1) covers the second sub-area 122. In an ideal design, the auxiliary pixel area 13 may be completely coincident with the second sub-area 122. Thus, when the display screen 1 is switched on, the display color of the auxiliary pixel area 13 is the same as the bezel area 14, so that a visual appearance of a black border does not appear at this position. Meanwhile, in consideration of a process error that is inevitably present in the actual manufacturing process, the coverage area of the auxiliary pixel region 13 may be set to be slightly larger than the second sub-area 122, for example, to extend to a part of the bezel area 14, so as to avoid a gap formed between the auxiliary pixel area 13 and the bezel area 14 by a window area alignment operation which will be described later.

According to some embodiments of the present disclosure, when the display screen 1 is switched off, the auxiliary pixels in the auxiliary pixel area 13 are controlled to display a same color as the display area 11, so that the color of the auxiliary pixel area 13 is the same as the display area 11 (e.g., both are black).

According to some embodiments of the present disclosure, the auxiliary pixels in the auxiliary pixel area 13 are controlled to not perform display when the screen is switched off. In this case, the black matrix exposed through the second sub-area 122 appears black, which is the same as the appearance of the display area 11 in the extinguished state.

According to some embodiments of the present disclosure, the auxiliary pixels in the auxiliary pixel area 13 are controlled to perform display so as to appear the same color as the bezel area 14 when the screen is switched off. In this case, the appearance (the color) of the auxiliary pixel area 13 remains the same as the bezel area 14 whether the display screen is switched on or off, thereby the display setting of the auxiliary pixels is simplified, and the appearance defect that may be caused by the display switching of the auxiliary pixels are avoided.

It will be appreciated that, when it is desired to set the display color of the auxiliary pixel area 13, the spectrum of the bezel area 14 under natural light may be measured first, and the corresponding spectral information is converted into RGB data information, and then the display color of the auxiliary pixel area 13 is set by using the RGB data information, so that the auxiliary pixel area 13 displays the color of the bezel area in an interpolation manner when the display screen 1 is switched on, thereby achieving the purpose of eliminating the black border.

In the embodiments of the present disclosure, the auxiliary pixel area 13 is provided around the display area 11 of the display screen 1, so that the display color of the auxiliary pixel area 13 is the same as the color of the bezel area 14 when the display screen 1 is switched on, avoiding the exposure of the black matrix at the edge of the display area from the window area in the case that the window area size of the display screen is increased, thereby it is possible to eliminate the black border on the display screen, optimize the appearance effect of the display screen, and improve market competitiveness.

In an embodiment of the present disclosure, as shown in FIG. 1, the auxiliary pixel area 13 may extend to a part of the bezel area provided in the periphery of the window area 12, that is, the coverage area of the auxiliary pixel area 13 includes the second sub-area 122 and a part of the bezel area. As such, by overlapping the auxiliary pixel area 13 and a part of the bezel area, it is avoided that a portion having no auxiliary pixels appears, due to the production error, at the junction of the window area 12 and the bezel area 14 and thus a different color appears, thereby ensuring the display effect of the display screen.

In the embodiments of the present disclosure, in designing the window area 12, the principles to be followed are at least two as follows: 1) ensuring that the window area 12 can accommodate all the pixels of the display area 11; 2) minimizing the boundary region of the display area 11 exposed from the window area 12.

Based on the above two principles, optionally, the lateral dimension of the window area 12 may be determined on the basis of the lateral dimension of the display area 11, the dimensional tolerance of the display area 11, and the dimensional tolerance of the window area 12; and/or, the longitudinal dimension of the window area 12 is determined on the basis of the longitudinal dimension of the display area 11, the dimensional tolerance of the display area 11, and the dimensional tolerance of the window area 12.

Further optionally, the lateral dimension $VA_W$ of the window area 12 may be as shown in formula 1:

$$VA_W = P_W \times a + T_{AA} + T_{VA} + k \times a \quad \text{(formula 1)}$$

the longitudinal dimension $VA_H$ of the window area 12 may be as shown in formula 2:

$$VA_H = P_H \times a + T_{AA} + T_{VA} + k \times a \quad \text{(formula 2)}$$

wherein, $P_W$ is the number of the lateral pixels of the display area 11, $P_H$ is the number of the longitudinal pixels of the display area 11, $T_{AA}$ is the dimensional tolerance of the display area 11, $T_{VA}$ is the dimensional tolerance of the window area 12, a is the dimension of a single pixel in the display area 11, and k is a preset coefficient. For example, k may be 2 to ensure the above principle 1).

In an embodiment of the present disclosure, optionally, the number of the lateral pixels of the auxiliary pixel area 13 may be determined on the basis of the lateral dimension of the window area 12, an assembly tolerance of the window area 12 and the display screen 1, and the number of the lateral pixels of the display area 11; and/or, the number of the longitudinal pixels of the auxiliary pixel area 13 may be determined on the basis of the longitudinal dimension of the window area 12, the assembly tolerance of the window area 12 and the display screen 1, and the number of the longitudinal pixels of the display area 11.

Further optionally, the number $SP_W$ of the lateral pixels of the auxiliary pixel area 13 may be as shown in formula 3:

$$SP_W \lceil (VA_W T_{AS}) \div a \rceil - P_W \quad \text{(formula 3)}$$

the number $SP_H$ of the longitudinal pixels of the auxiliary pixel area 13 may be as shown in formula 4:

$$SP_H = \lceil (VA_H + T_{AS}) \div a \rceil - P_H \quad \text{(formula 4)}$$

wherein, $VA_W$ is the lateral dimension of the window area 12, $VA_H$ is the longitudinal dimension of the window area 12, $T_{AS}$ is the assembly tolerance of the window area 12 and the display screen 1, $P_W$ is the number of the lateral pixels of the display area 11, $P_H$ is the number of the longitudinal pixels of the display area 11, a is the dimension of a single pixel in the display area 11, and $\lceil\ \rceil$ is a ceiling symbol.

In the embodiment of the present disclosure, since there are tolerances in the size of the display area, the size of the window area, the assembly of the window area and the display screen, and so on, the number of the auxiliary pixels in the four sides of the auxiliary pixel area may be dynamically allocated depending on the actual situation of the display screen, to ensure that the display area is not shielded and is located in the middle of the display screen as far as possible.

Wherein, the auxiliary pixel area 13 may be divided into a first region and a second region laterally opposed to each other, and a third region and a fourth region longitudinally opposed to each other. Further, the number of the lateral pixels of each of the first region and the second region may be determined on the basis of the number of the lateral pixels of the auxiliary pixel area 13, the number of the lateral pixels of the first region shielded by the bezel area 14, and the number of the lateral pixels of the second region shielded by the bezel area 14; and/or, the number of the longitudinal pixels of each of the third region and the fourth region may be determined on the basis of the number of the longitudinal pixels of the auxiliary pixel area 13, the number of the longitudinal pixels of the third region shielded by the bezel area 14, and the number of the longitudinal pixels of the fourth region shielded by the bezel area 14.

For example, also referring to FIG. 1, the first region may be the left-side region in the auxiliary pixel area 13 with respect to the display area 11, the second region may be the right-side region in the auxiliary pixel area 13 with respect to the display area 11, the third region may be the upper-side region in the auxiliary pixel area 13 with respect to the display area 11, and the fourth region may be the lower-side region in the auxiliary pixel area 13 with respect to the display area 11.

Optionally, the number $SPL_W$ of the lateral pixels of the first region may be as shown in formula 5:

$$SPL_W = [(SP_W - N_L - N_R) \div 2] + N_L \quad \text{(formula 5)}$$

the number $SPR_W$ of the lateral pixels of the second region may be as shown in formula 6:

$$SPR_W = SP_W - SPL_W \quad \text{(formula 6)}$$

the number $SPU_H$ of the longitudinal pixels of the third region may be as shown in formula 7:

$$SPU_N = [(SP_H - N_U - N_D) \div 2] + N_U \quad \text{(formula 7)}$$

the number $SPD_H$ of the longitudinal pixels of the fourth region may be as shown in formula 8:

$$SPD_H = SP_H - SPU_H \quad \text{(formula 8)}$$

wherein $SP_W$ is the number of the lateral pixels of the auxiliary pixel area 13, $SP_H$ is the number of the longitudinal pixels of the auxiliary pixel area 13, $N_L$ is the number of the lateral pixels of the first region shielded by the bezel area 14, $N_R$ is the number of the lateral pixels of the second region shielded by the bezel area 14, $N_U$ is the number of the longitudinal pixels of the third region shielded by the bezel area 14, $N_D$ is the number of the longitudinal pixels of the fourth region shielded by the bezel area 14, and [ ] is a rounding symbol.

Figure 2:
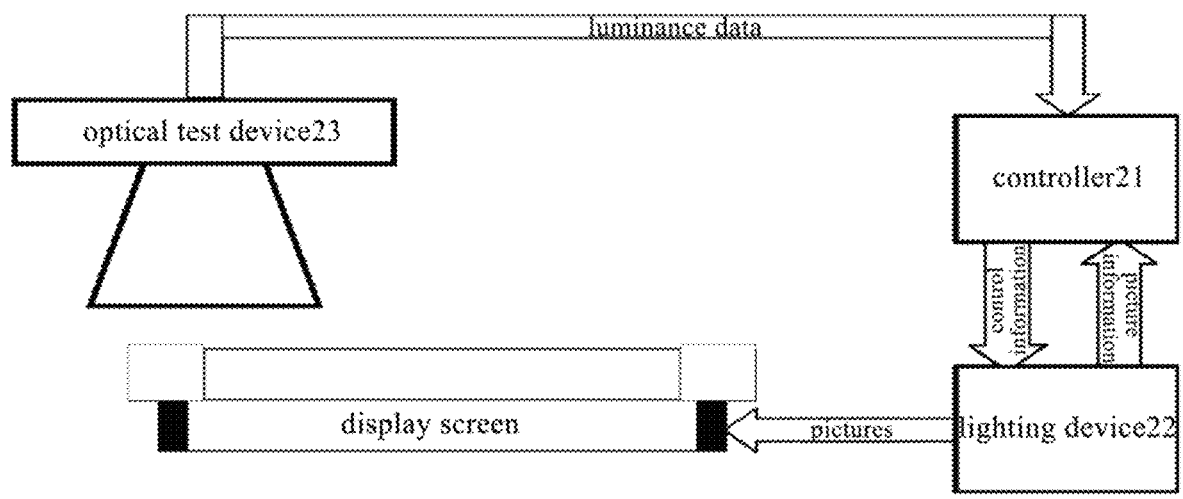
FIG. 2 is a structural diagram of a detection system of an embodiment of the present disclosure.

It should be noted that, the above $N_L$, $N_R$, $N_U$ and $N_D$ (i.e., the number of the pixels shielded by the bezel area) may be detected by the detection system shown in FIG. 2, respectively. As shown in FIG. 2, the detection system may include a controller 21, a lighting device 22 and an optical test device 23 (such as a picture detector).

Figure 3:
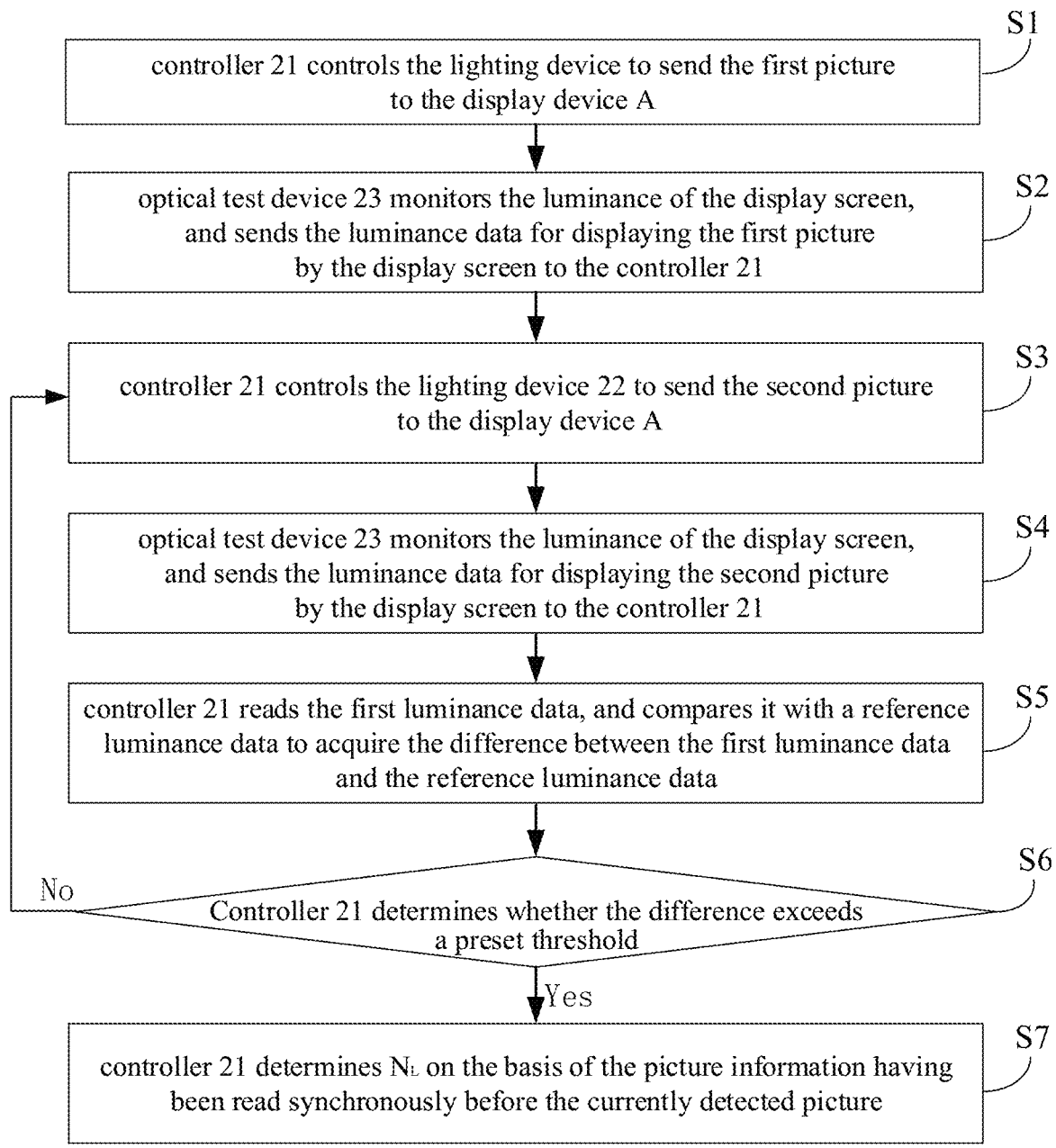
FIG. 3 is a flow chart of a detection process of an embodiment of the present disclosure.

Referring to FIGS. 2 and 3, the detection process of the above detection system will be described by taking the detection and acquisition of $N_L$ as an example.

First, before performing the detection, it is required to make a set of detection pictures, specifically: for the first picture, all columns of pixels are black; for the second picture, the first column of pixels from left to right is lit, and other columns of pixels except the first column of pixels are black; for the third picture, the second column of pixels from left to right is lit, and other columns of pixels except the second column of pixels are black; for the fourth picture, the third column of pixels from left to right is lit, and other columns of pixels except the third column of pixels are black; and so on, until the n-th picture. It should be noted that, in the n-th picture, the lit (n−1)-th column of pixels may be located at a preset position of all the columns of pixels in the picture, such as a position at 1/50 from left to right of all the columns of pixels.

It is assumed that $N_L$ of the display screen of the display device A is to be detected, and all columns of pixels of the display screen includes all columns of pixels in the display area and all columns of pixels in the auxiliary pixel area. It should be noted that, different from an actual normal display process (during which the display area is used to display images to be displayed), the area for displaying the above detection pictures during the detection process is the display area and the auxiliary pixel area, that is, the above detection pictures correspond to all columns of pixels of the display screen. Referring to FIGS. 2 and 3, the detection process may include the following steps:

S1: the controller 21 controls the lighting device 22 to send the first picture to the display device A so as to display the first picture by using the display screen of the display device A;

S2: the optical test device 23 monitors the luminance of the display screen, and sends luminance data for displaying the first picture by the display screen to the controller 21, so that the controller 21 stores the luminance data as a comparison reference for a subsequent luminance change, and thus this luminance data may be referred to as reference luminance data;

S3: the controller 21 controls, by using control information, the lighting device 22 to send the second picture to the display device A so as to display the second picture using the display screen, and at the same time, the controller 21 reads corresponding picture information synchronously;

S4: the optical test device 23 monitors the luminance of the display screen, and sends the first luminance data for displaying the second picture by the display screen to the controller 21;

S5: the controller 21 reads the first luminance data, and compares it with the reference luminance data to acquire the difference between the first luminance data and the reference luminance data;

S6: the controller 21 determines whether the difference exceeds a preset threshold; wherein, when the difference does not exceed the preset threshold, the controller 21 controls the lighting device 22 to send a next picture, and steps S3 to S6 are repeated; when the difference exceeds the preset threshold, step S7 is performed;

S7: the controller 21 determines the number $N_L$ of the columns of pixels shielded from left to right of the auxiliary pixel area on the basis of the picture information having been read synchronously before the currently detected picture. For example, if the sixth picture is to be detected, and the corresponding difference exceeds the preset threshold, the determined $N_L$ is 4, that is, the lit columns of pixels corresponding to the second to fifth pictures are shielded.

It will be appreciated that, $N_R$, $N_U$, and $N_D$ may also be detected by detection processes similar to the above detection process, and will not be repeated here.

In the embodiments of the present disclosure, since the area of all pixels of the display screen 1 (including the pixels in the display area and the pixels in the auxiliary area) may be greater than the area corresponding to the window area 13, there is inevitably a problem that the bezel area 14 shields some of the pixels, thereby causing the color of the edge of the window area 13 to be different. In order to overcome the problem of the edge color difference of the window region 13, the embodiments of the present disclosure may perform luminance compensation on the shielded pixels by adjacent pixels.

Specifically, when a n-th column of sub-pixels of the auxiliary pixel area 13 is shielded by the bezel area 14, the luminance compensation may be performed by a m-th column of sub-pixels adjacent to the n-th column of pixels, wherein the m-th column of sub-pixels has the same color as the n-th column of sub-pixels and is not shielded by the bezel area 14. The color of the n-th column of sub-pixels may be red, green, or blue.

Optionally, a luminance compensation value ΔL of the m-th column of sub-pixels may be:

$$\Delta L = x \div a \times L;$$

wherein x is a shielded width of the n-th column of sub-pixels, a is a width of the n-th column of sub-pixels, and L is a luminance of the m-th column of sub-pixels.

Alternatively, when a (n+1)-th column of sub-pixels and a (n+2)-th column of sub-pixels which belong to the same pixel as the n-th column of sub-pixels are completely shielded by the bezel area 14, a luminance compensation value $\Delta L_1$ of the (m+1)-th column of sub-pixels is:

$$\Delta L_1 = (1 - x \div a) \times L_1;$$

a luminance compensation value $\Delta L_2$ of the (m+2)-th column of sub-pixels is:

$$\Delta L_2 = (1 - x \div a) \times L_2;$$

wherein the (m+1)-th column of sub-pixels is adjacent to the (n+1)-th column of sub-pixels, has a same color as the (n+1)-th column of sub-pixels and is not shielded by the bezel area 14, the (m+2)-th column of sub-pixels is adjacent to the (n+2)-th column of sub-pixels, has a same color as the (n+2)-th column of sub-pixels, and is not shielded by the bezel area 14; x is the shielded width of the n-th column of sub-pixels, a is the width of the n-th column of sub-pixels, $L_1$ is a luminance of the (m+1)-th column of sub-pixels, and $L_2$ is a luminance of the (m+2)-th column of sub-pixels.

Figure 4A:
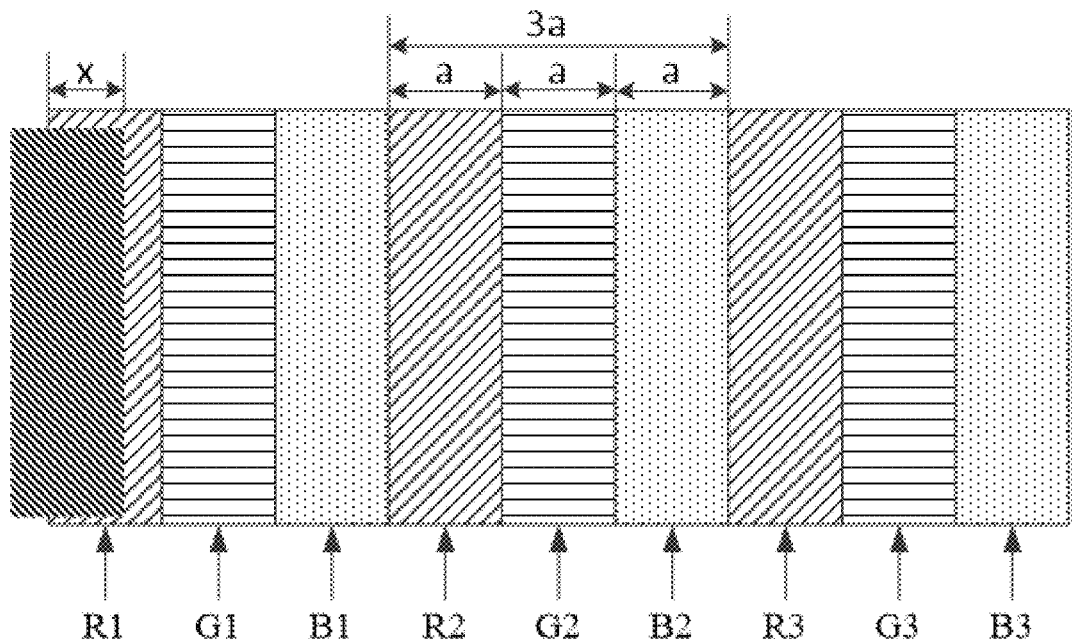
FIG. 4A is a first schematic diagram of a luminance compensation of an embodiment of the present disclosure.
Figure 4B:
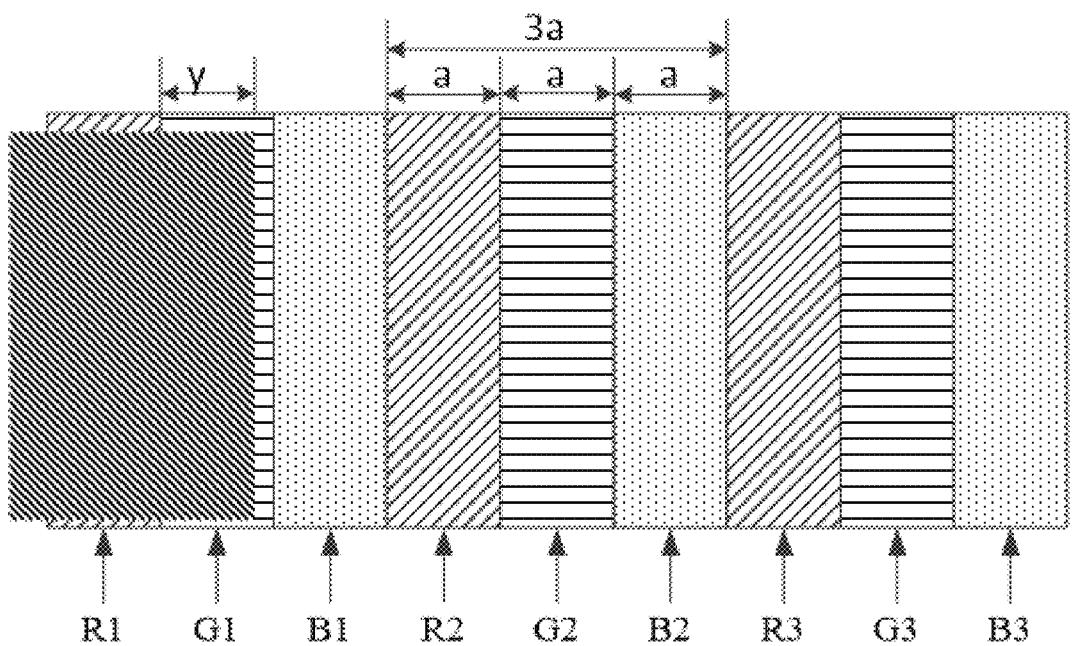
FIG. 4B is a second schematic diagram of a luminance compensation of an embodiment of the present disclosure.
Figure 4C:
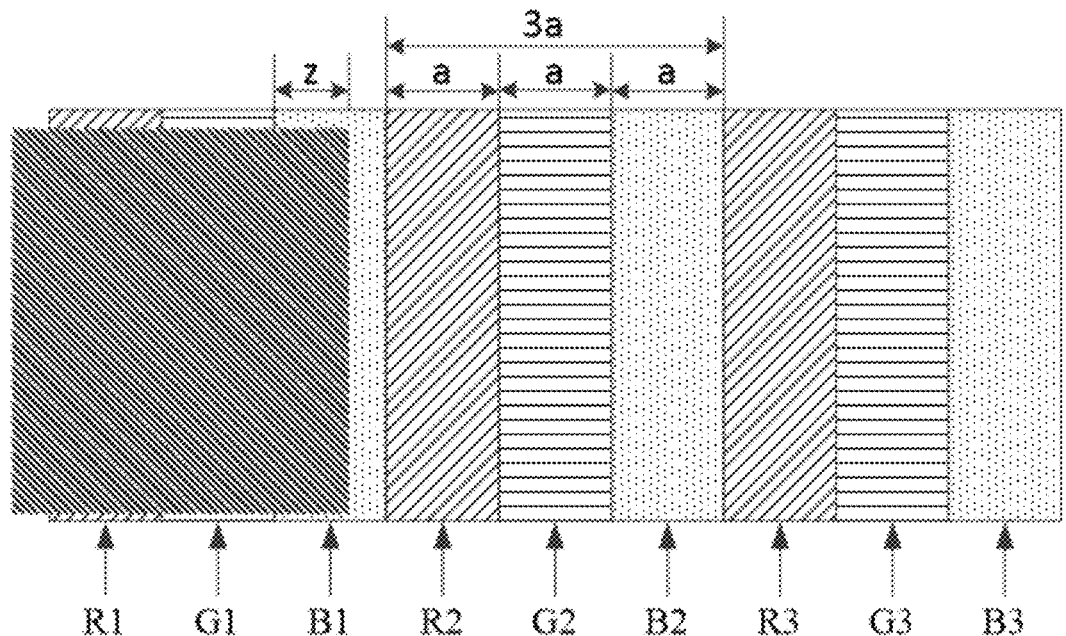
FIG. 4C is a third schematic diagram of a luminance compensation of an embodiment of the present disclosure.

For example, referring to FIGS. 4A to 4C, taking the left side thereof as an example, a corresponding luminance compensation process may be:

Case 1: as shown in FIG. 4A, if a part of a column of red sub-pixels is shielded, the luminance compensation may be achieved by increasing the luminance of the column of red sub-pixels in adjacent pixels. If the width of an RGB pixel is 3a, and accordingly, the width of a column of red sub-pixels is a, the width of a column of green sub-pixels is a, the width of a column of blue sub-pixels is a, the shielded width of a shielded column R1 of red sub-pixels is x, and the luminance of the adjacent column R2 of red sub-pixels is $L_R$, then an added luminance value of the adjacent column R2 of red sub-pixels is:

$$\Delta L_R = x \div a \times L_R.$$

Case 2: as shown in FIG. 4B, if the entire column R1 of red sub-pixels and a part of the column G1 of green sub-pixels is shielded, the shielded width of the column G1 of green sub-pixels is y, the luminance of the adjacent column R2 of red sub-pixels is $L_R$, and the luminance of the adjacent column G2 of green sub-pixels is $L_G$, then the compensation for the entirely shielded column R1 of red sub-pixels may be achieved by doubling the luminance of the adjacent column R2 of red sub-pixels, i.e., an added luminance value of the adjacent column R2 of red sub-pixels is: $\Delta L_R = L_R$; for the partially shielded column G1 of green sub-pixels, an added luminance value of the adjacent column G2 of green sub-pixels is:

$$\Delta L_G = y \div a \times L_G.$$

Case 3: as shown in FIG. 4C, if the entire column R1 of red sub-pixels, the entire column G1 of green sub-pixels, and a part of the column B1 of blue sub-pixels is shielded, the shielded width of the column G1 of green sub-pixels is z, the luminance of the adjacent column R2 of red sub-pixels is $L_R$, the luminance of the adjacent column G2 of green sub-pixels is $L_G$, and the luminance of the adjacent column B2 of blue sub-pixels is $L_B$, then, the compensation for the entirely shielded column R1 of red sub-pixels may be achieved by increasing the luminance of the adjacent column R2 of red sub-pixels, for example, an added luminance value of the adjacent column R2 of red sub-pixels may be: $\Delta L_R=(1-z\div a)\times L_R$; the compensation for the entirely shielded column G1 of green sub-pixels may be achieved by increasing the luminance of the adjacent column G2 of red sub-pixels, for example, an added luminance value of the adjacent column G2 of green sub-pixels may be: $\Delta L_G=(1-z\div a)\times L_G$; for the partially shielded column B1 of blue sub-pixels, an added luminance value of the adjacent column B2 of blue sub-pixels may be:

$$\Delta L_B=z\div a\times L_B;$$

It will be appreciated that, the luminance compensation process for the right side of the display screen is similar to the above luminance compensation process for the left side, and will not be repeated here. Based on the display principle of the display screen pixels, obviously, when the pixels on the upper and the lower sides, they do not require an optical compensation.

Furthermore, an embodiment of the present disclosure provides a display device including the above display screen.

Figure 5:
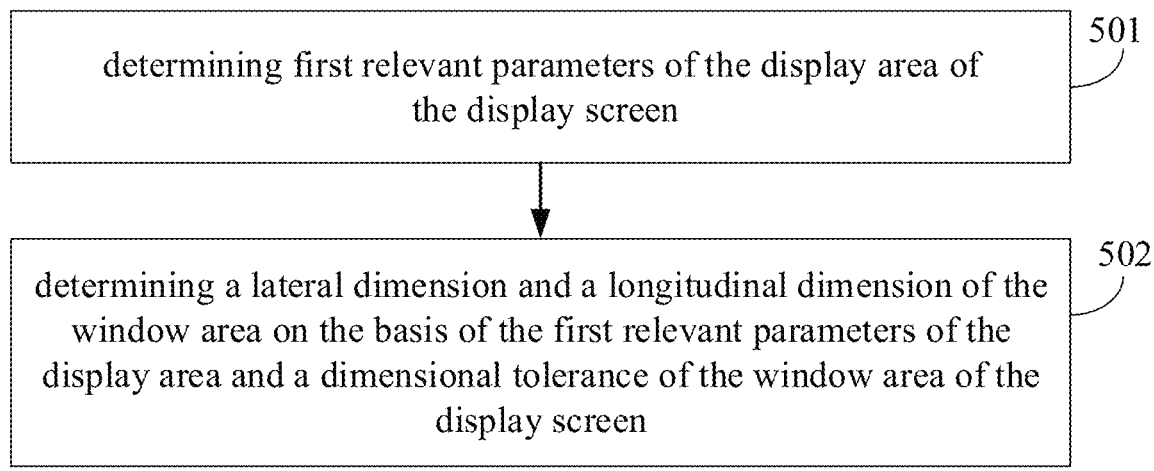
FIG. 5 is a flow chart of a method for determining the size of a window area of an embodiment of the present disclosure.

Specifically, as shown in FIG. 5, an embodiment of the present disclosure further provides a method for determining a size of a window area applied to the above display screen, and the method may include the following steps:

Step 501: determining first relevant parameters of the display area of the display screen;

Step 502: determining a lateral dimension and a longitudinal dimension of the window area on the basis of the first relevant parameters of the display area and a dimensional tolerance of the window area of the display screen;

wherein the first relevant parameters of the display area include: the number of the lateral pixels of the display area, the number of the longitudinal pixels of the display area, the dimension of a single pixel in the display area, and the dimensional tolerance of the first sub-area.

In this way, the size of a corresponding window area can be determined accurately by means of the size of the display area.

Optionally, the lateral dimension $VA_W$ of the window area may be:

$$VA_W=P_W\times a+T_{AA}+T_{VA}+k\times a;$$

the longitudinal dimension $VA_H$ of the window area may be:

$$VA_H=P_H\times a+T_{AA}+T_{VA}+k\times a;$$

wherein, $P_W$ is the number of the lateral pixels of the display area, $P_H$ is the number of the longitudinal pixels of the display area, $T_{AA}$ is the dimensional tolerance of the display area, $T_{VA}$ is the dimensional tolerance of the window area, a is the dimension of a single pixel in the first sub-area, and k is a preset coefficient.

Figure 6:
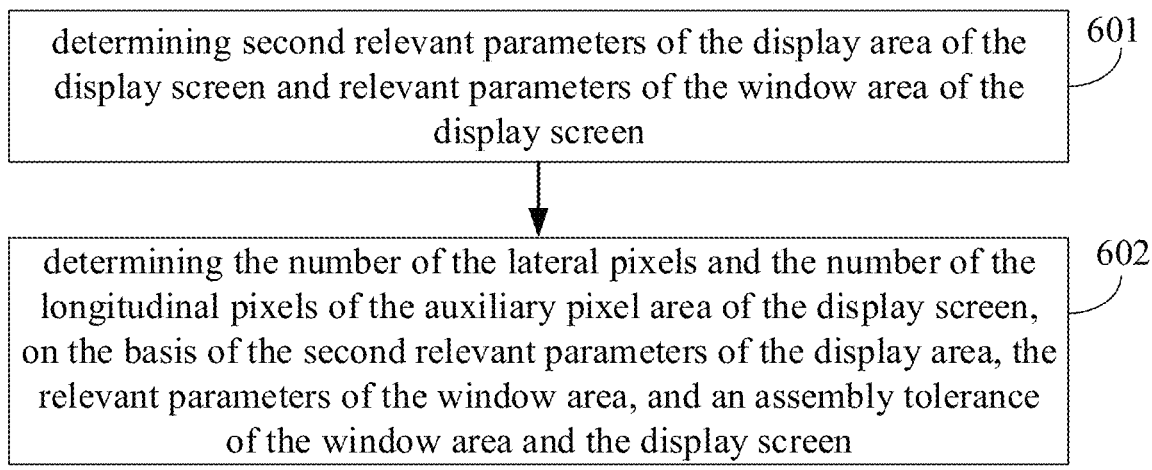
FIG. 6 is a flow chart of a method for determining the number of pixels in an auxiliary pixel area of an embodiment of the present disclosure.

Referring to FIG. 6, an embodiment of the present disclosure further provides a method for determining the number of pixels of the auxiliary pixel area applied to the above display screen, and the method may include the following steps:

Step 601: determining second relevant parameters of the display area of the display screen and relevant parameters of the window area of the display screen;

Step 602: determining the number of the lateral pixels and the number of the longitudinal pixels of the auxiliary pixel area of the display screen, on the basis of the second relevant parameters of the display area, the relevant parameters of the window area, and an assembly tolerance of the window area and the display screen;

wherein the second relevant parameters of the display area include: the number of the lateral pixels of the display area, the number of the longitudinal pixels of the display area, and the dimension of a single pixel in the display area; the relevant parameters of the window area include: the lateral dimension of the window area, and the longitudinal dimension of the window area.

In this way, the number of the lateral pixels and the number of the longitudinal pixels of the auxiliary pixel area can be determined accurately by means of the sizes of the display area and the window area.

Optionally, the number $SP_W$ of the lateral pixels of the auxiliary pixel area may be:

$$SP_W=\lceil(VA_W+T_{AS})\div a\rceil-P_W;$$

the number $SP_H$ of the longitudinal pixels of the auxiliary pixel area may be:

$$SP_H=\lceil(VA_H+T_{AS})\div a\rceil-P_H;$$

wherein, $VA_W$ is the lateral dimension of the window area, $VA_H$ is the longitudinal dimension of the window area, $T_{AS}$ is the assembly tolerance of the window area and the display screen, $P_W$ is the number of lateral pixels of the first sub-area, $P_H$ is the number of longitudinal pixels of the first sub-area, a is the dimension of a single pixel in the first sub-area, and $\lceil\ \rceil$ is a ceiling symbol.

Figure 7:
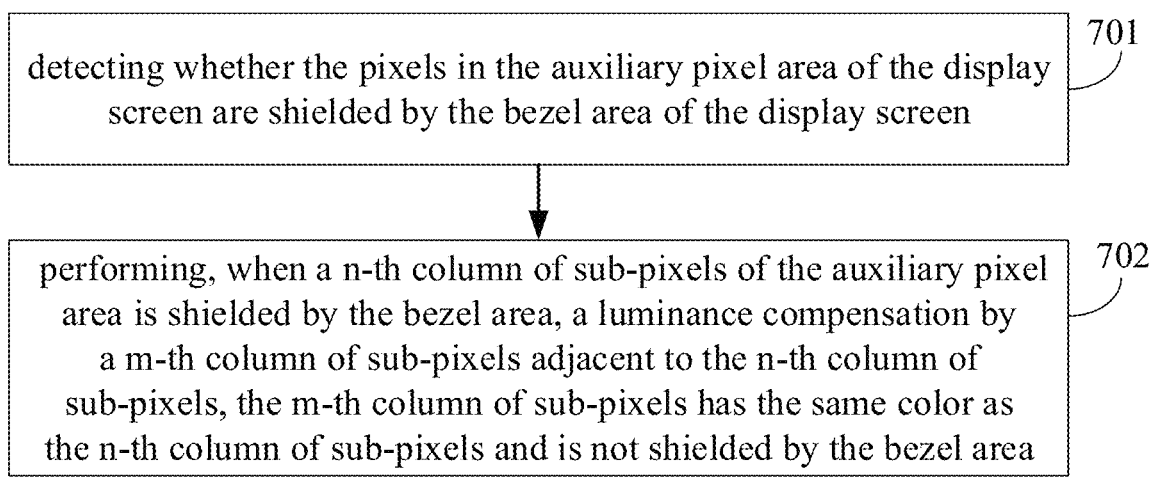
FIG. 7 is a flow chart of a luminance compensation method of an embodiment of the present disclosure.

Referring to FIG. 7, an embodiment of the present disclosure further provides a luminance compensation method applied to the above display screen, and the method may include the following steps:

Step 701: detecting whether the pixels in the auxiliary pixel area of the display screen are shielded by the bezel area of the display screen;

Step 702: performing, when a n-th column of sub-pixels of the auxiliary pixel area is shielded by the bezel area, a luminance compensation by a m-th column of sub-pixels adjacent to the n-th column of sub-pixels, the m-th column of sub-pixels has the same color as the n-th column of sub-pixels and is not shielded by the bezel area.

In this way, by performing the luminance compensation on the shielded sub-pixels by the adjacent column of sub-pixels, the problem of edge color difference may be eliminated.

Optionally, a luminance compensation value $\Delta L$ of the m-th column of sub-pixels may be:

$$\Delta L=x\div a\times L$$

wherein, x is the shielded width of the n-th column of sub-pixels, a is the width of the n-th column of sub-pixels, and L is the luminance of the m-th column of sub-pixels.

Optionally, when a (n+1)-th column of sub-pixels and a (n+2)-th column of sub-pixels which belong to a same pixel as the n-th column of sub-pixels are completely shielded by the bezel area, a luminance compensation value $\Delta L_1$ of the (m+1)-th column of sub-pixels may be:

$$\Delta L_1=(1-x\div a)\times L_1;$$

a luminance compensation value $\Delta L_2$ of the (m+2)-th column of sub-pixels may be:

$$\Delta L_2=(1-x\div a)\times L_2;$$

wherein the (m+1)-th column of sub-pixels is adjacent to the (n+1)-th column of sub-pixels, has a same color as the (n+1)-th column of sub-pixels, and is not shielded by the bezel area, the (m+2)-th column of sub-pixels is adjacent to the (n+2)-th column of sub-pixels, has a same color as the (n+2)-th column of sub-pixels, and is not shielded by the bezel area; x is the shielded width of the n-th column of sub-pixels, a is the width of the n-th column of sub-pixels, $L_1$ is the luminance of the (m+1)-th column of sub-pixels, and $L_2$ is the luminance of the (m+2)-th column of sub-pixels.

The above embodiments are merely the preferred implementations of the present disclosure. It should be noted that, those skilled in the art may make various modifications and improvements without departing from the principle of the present disclosure, and these modifications and improvements should also be considered as the protective scope of the present disclosure.

What is claimed is:

1. A display screen, comprising a window area and a bezel area;
wherein the window area comprises a first sub-area for actual display and a second sub-area provided around the first sub-area, the bezel area is provided in a periphery of the window area,
the display screen further comprises an auxiliary pixel area provided with multiple auxiliary pixels, the auxiliary pixel area covers at least the second sub-area, and the auxiliary pixels are configured to present a same color as the bezel area when the display screen is switched on,
wherein a lateral dimension of the window area is determined on the basis of a lateral dimension of the first sub-area, a dimensional tolerance of the first sub-area, and a dimensional tolerance of the window area; or a longitudinal dimension of the window area is determined on the basis of a longitudinal dimension of the first sub-area, the dimensional tolerance of the first sub-area, and the dimensional tolerance of the window area.

2. The display screen according to claim 1, wherein the auxiliary pixels are controlled to present a same color as the first sub-area when the display screen is switched off.

3. The display screen according to claim 1, wherein the auxiliary pixels are controlled to not perform display when the display screen is switched off.

4. The display screen according to claim 1, wherein the auxiliary pixels are controlled to present a same color as the bezel area when the display screen is switched off.

5. The display screen according to claim 1, wherein the auxiliary pixel area is overlapped with a part of the bezel area, and auxiliary pixels located at the overlapping position are shielded by the bezel.

6. The display screen according to claim 5, wherein, when a n-th column of sub-pixels of the auxiliary pixel area is shielded by the bezel area, a luminance compensation is performed by a m-th column of sub-pixels adjacent to the n-th column of sub-pixels, the m-th column of sub-pixels having a same color as the n-th column of sub-pixels and is not shielded by the bezel area.

7. The display screen according to claim 6, wherein a luminance compensation value $\Delta L_1$ of the (m+1)-th column of sub-pixels is:

$\Delta L = x \div a \times L$ wherein, x is a shielded width of the n-th column of sub-pixels, a is a width of the n-th column of sub-pixels, and L is a luminance of the m-th column of sub-pixels.

8. The display screen according to claim 6, wherein, when a (n+1)-th column of sub-pixels and a (n+2)-th column of sub-pixels which belong to a same pixel as the n-th column of sub-pixels are completely shielded by the bezel area, a luminance compensation value $\Delta L_1$ of the (m+1)-th column of sub-pixels is: $\Delta L_1 = (1 - x \div a \times L_1$;
a luminance compensation value $\Delta L_2$ of the (m+2)-th column of sub-pixels is:

$\Delta L_2 = (1 - X \div a \times L_2$;

wherein the (m+1)-th column of sub-pixels is adjacent to the (n+1)-th column of sub-pixels, has a same color as the (n+1)-th column of sub-pixels, and is not shielded by the bezel area, the (m+2)-th column of sub-pixels is adjacent to the (n+2)-th column of sub-pixels, has a same color as the (n+2)-th column of sub-pixels, and is not shielded by the bezel area; x is a shielded width of the n-th column of sub-pixels, a is a width of the n-th column of sub-pixels, $L_1$ is a luminance of the (m+1)-th column of sub-pixels, and $L_2$ is a luminance of the (m+2)-th column of sub-pixels.

9. The display screen according to claim 1, wherein,
the lateral dimension VAw of the window area is:
$VA_W = P_W \times \alpha + T_{AA} + T_{VA} + k \times \alpha$;
the longitudinal dimension $VA_H$ of the window area is:
$VA_H = P_H \times \alpha + T_{AA} + T_{VA} + k \times \alpha$;
wherein, Pw is a number of lateral pixels of the first sub-area, $P_H$ is a number of longitudinal pixels of the first sub-area, $T_{AA}$ is the dimensional tolerance of the first sub-area, $T_{VA}$ is the dimensional tolerance of the window area, α is a dimension of a single pixel in the first sub-area, and k is a preset coefficient.

10. A display device, comprising the display screen according to claim 1.

11. A luminance compensation method applied to the display screen according to claim 1, comprising:
detecting whether pixels in the auxiliary pixel area of the display screen are shielded by the bezel area of the display screen;
performing, when a n-th column of sub-pixels of the auxiliary pixel area is shielded by the bezel area, a luminance compensation by a m-th column of sub-pixels adjacent to the n-th column of sub-pixels, the m-th column of sub-pixels having a same color as the n-th column of sub-pixels and is not shielded by the bezel area.

12. A display screen, comprising a window area and a bezel area;
wherein the window area comprises a first sub-area for actual display and a second sub-area provided around the first sub-area, the bezel area is provided in a periphery of the window area,
the display screen further comprises an auxiliary pixel area provided with multiple auxiliary pixels, the auxiliary pixel area covers at least the second sub-area, and the auxiliary pixels are configured to present a same color as the bezel area when the display screen is switched on,
wherein a number of lateral pixels of the auxiliary pixel area is determined on the basis of a lateral dimension of the window area, an assembly tolerance of the window area and the display screen, and a number of lateral pixels of the first sub-area; or a number of longitudinal pixels of the auxiliary pixel area is determined on the basis of a longitudinal dimension of the window area, the assembly tolerance of the window area and the display screen, and a number of longitudinal pixels of the first sub-area.

13. The display screen according to claim 12, wherein, the number SPw of the lateral pixels of the auxiliary pixel area is:

$SP_W = \lceil (VA_W + T_{AS}) \div \alpha \rceil - P_W$;

the number $SP_H$ of the longitudinal pixels of the auxiliary pixel area is:

$SP_H = \lceil (VA_H + T_{AS}) \div \alpha \rceil - P_H$;

wherein, $VA_W$ is the lateral dimension of the window area, $VA_H$ is the longitudinal dimension of the window area, $T_{AS}$ is the assembly tolerance of the window area and the display screen, $P_W$ is the number of lateral pixels of the first sub-area, $P_H$ is the number of longitudinal pixels of the first sub-area, $\alpha$ is a dimension of a single pixel in the first sub-area, and is a ceiling symbol.

14. A display screen, comprising a window area and a bezel area;

wherein the window area comprises a first sub-area for actual display and a second sub-area provided around the first sub-area, the bezel area is provided in a periphery of the window area, the display screen further comprises an auxiliary pixel area provided with multiple auxiliary pixels, the auxiliary pixel area covers at least the second sub-area, and the auxiliary pixels are configured to present a same color as the bezel area when the display screen is switched on, wherein the auxiliary pixel area is overlapped with a part of the bezel area, and auxiliary pixels located at the overlapping position are shielded by the bezel, wherein the auxiliary pixel area is divided into a first region and a second region laterally opposed to each other, and a third region and a fourth region longitudinally opposed to each other;

a number of lateral pixels of each of the first region and the second region is determined on the basis of a number of lateral pixels of the auxiliary pixel area, a number of lateral pixels of the first region shielded by the bezel area, and a number of lateral pixels of the second region shielded by the bezel area; or a number of longitudinal pixels of each of the third region and the fourth region is determined on the basis of a number of longitudinal pixels of the auxiliary pixel area, a number of longitudinal pixels of the third region shielded by the bezel area, and a number of longitudinal pixels of the fourth region shielded by the bezel area.

15. The display screen according to claim 14, wherein, the number $SPL_W$ of the lateral pixels of the first region is:

$SPL_W = \lfloor (SP_W - N_L - N_R) \div 2 \rfloor + N_L$;

the number $SPR_W$ of the lateral pixels of the second region is:

$SPR_W = SP_W - SPL_W$;

the number $SPU_H$ of the longitudinal pixels of the third region is:

$SPU_H = \lfloor (SP_H - N_U - N_D) \div 2 \rfloor + N_u$;

the number $SPD_H$ of the longitudinal pixels of the fourth region is:

$SPD_H = SP_H - SPU_H$;

wherein SPw is the number of the lateral pixels of the auxiliary pixel area, $SP_H$ is the number of the longitudinal pixels of the auxiliary pixel area, $N_L$ is the number of the lateral pixels of the first region shielded by the bezel area, $N_R$ is the number of the lateral pixels of the second region shielded by the bezel area, $N_U$ is the number of the longitudinal pixels of the third region shielded by the bezel area, $N_D$ is the number of the longitudinal pixels of the fourth region shielded by the bezel area, and is a rounding symbol.

\* \* \* \* \*